358-84. OR 3,109,883 SR

Nov. 5, 1963 C. R. HARNETT 3,109,883

VARIABLE RATE METERING DEVICES AND SYSTEM FOR USE THEREWITH

Filed March 22, 1962 4 Sheets-Sheet 1

Inventor
Charles Ray Harnett
By Cushman, Darby & Cushman
Attorneys

Inventor
Charles Ray Harnett
By Cushman, Darby & Cushman
Attorneys

VARIABLE RATE METERING DEVICES AND SYSTEM FOR USE THEREWITH

Filed March 22, 1962

Inventor
Charles Ray Harnett
By Cushman, Darby & Cushman
Attorneys

Nov. 5, 1963 C. R. HARNETT 3,109,883

VARIABLE RATE METERING DEVICES AND SYSTEM FOR USE THEREWITH

Filed March 22, 1962 4 Sheets-Sheet 4

Inventor
Charles Ray Harnett
By Cushman, Darby & Cushman
Attorneys

United States Patent Office 3,109,883

Patented Nov. 5, 1963

3,109,883

VARIABLE RATE METERING DEVICES AND SYSTEM FOR USE THEREWITH

Charles Ray Harnett, Rexdale, Toronto, Ontario, Canada, assignor to Charge-A-Vision International Ltd., Rexdale, Toronto, Ontario, Canada Filed Mar. 22, 1962, Ser. No. 181,540
Claims priority, application Canada Feb. 6, 1962
16 Claims. (Cl. 178—5.1)

This invention relates generally to improvements in variable-rate metering devices.

The device described herein may be used with or embodied in the credit entertainment distribution system, which is the subject of the applicant's copending United States patent application Serial Number 87,181 filed February 6, 1961. It will be apparent, however, that the device is not limited to use with such a system.

Briefly speaking, the variable-rate metering device of application Ser. No. 87,181 comprises a synchronous motor, and an elapsed time meter. The motor is connected to the meter by means of a wheel provided with projections parallel to its axis which turn a gear to drive the meter. To change the rate of the meter a second wheel, coaxial with the first wheel, and with projections parallel to its axis, moves axially with respect to the first wheel and in so doing inserts a second set of projections through openings in the first wheel which now also engage the gear wheel of the meter. The second wheel is moved by a lever arm which is connected to a switch responsive solenoid.

It has now been realized that the variable rate metering device of Ser. No. 87,181 does possess certain disadvantages which the present invention seeks to overcome. For example the previous device lacks the durability of the present invention in that it requires a solenoid to actuate the rate changing means. The projecting pins are also subject to breakage under hard use and the two wheels must be kept in exact alignment. In addition, the solenoid and projecting mechanical pin connection are comparatively expensive and require careful assembly. The elimination of these two features from the present invention provides a device which is not only simpler in construction but also cheaper to manufacture and more durable.

The previous variable rate metering device also required frequent oiling to permit easy sliding of the pins through the apertures. The oil attracted dust making the operating parts sticky and the device less efficient. If sufficient friction is developed by this weakness the energy of the solenoid may not be sufficient to overcome it, and permit the device to operate quickly and successfully. The previous mechanical connection was also found to be comparatively noisy in that its operation was completed in the form of jerks and not with a desired regular and smooth action.

The need for an improved variable rate metering device is therefore apparent. The object of this invention is to fill this need.

Accordingly, therefore, the present invention relates to a secret television system in which a plurality of visual signals are transmitted with their associated aural signals in a protected manner to provide a plurality of protected television programmes, each of said programmes having a different monetary value, the invention including at a subscriber's receiving station the combination of translating means to render such otherwise protected programmes available, switching means for selecting one of said available programmes and meter means comprising: a synchronous motor actuated by said switching means, a rotatable shaft secured to said motor, an elapsed time meter, a gear assembly, said assembly connecting said motor shaft with said elapsed time meter, said gear assembly including a plurality of gear wheels, said wheels being drivably connected with said elapsed time meter so that rotation of said motor shaft actuates said elapsed time meter to indicate thereon at a predetermined rate the debt incurred by the subscriber.

The invention is described hereafter and illustrated in one of its preferred embodiments.

Figure 1:
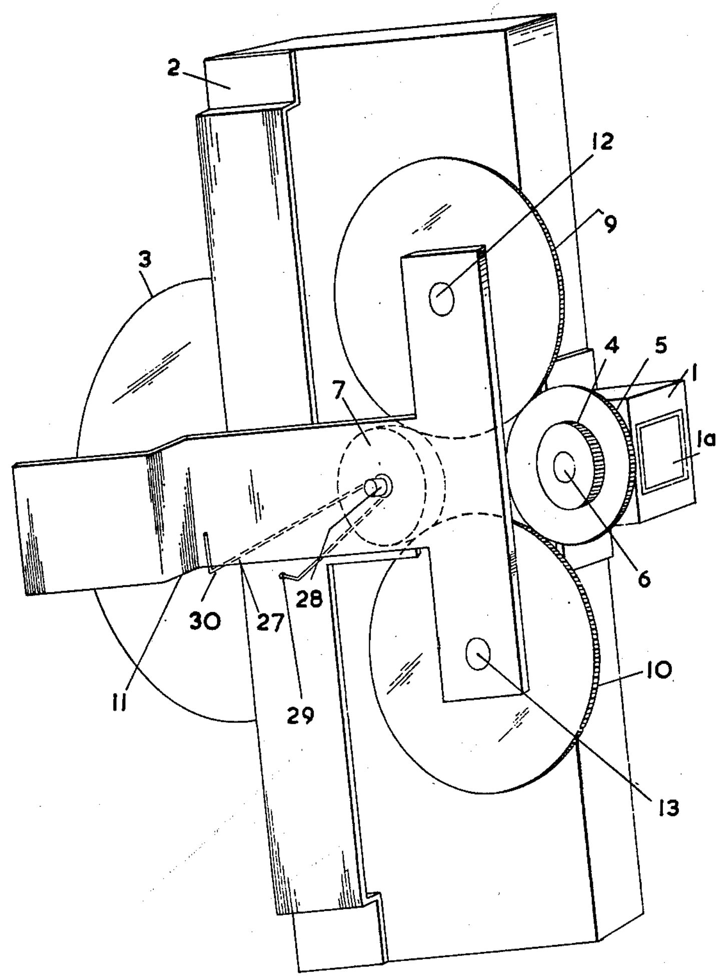
FIGURE 1 is a perspective view illustrating the general structure of the variable-rate meter device.

In the drawings a counter designated generally at 1 has visual indicating window 1*a* and a synchronous sealed electric motor 3, both mounted rigidly on a supporting frame 2. Two gear wheels 4 and 5 are rigidly mounted on a rotatable shaft 6 of counter 1. The diameter of gear wheel 4 is substantially equal to ½ of the diameter of gear wheel 5. Gear wheel 7 is rigidly mounted on shaft 8 of the sealed synchronous electric motor 3. A T-shaped frame 11 is rotatably mounted on frame 2 by means of a permanently lubricated sealed bearing 28. Two gear wheels 9 and 10 of equal size are rotatably mounted on the ends of T-shaped frame 11 by means of shafts 12 and 13 respectively and on permanently lubricated sealed bearings 14 and 15 respectively. Shaft 12 is longer than shaft 13 such that gear wheel 9 is axially more remote from frame 11 than gear wheel 10 whereby on movement of frame 11 the gear wheels 9 and 10 engage gear wheels 5 and 4 respectively. Frame 11 is so mounted pivotally on frame 2 that both gear wheels 9 and 10 are in constant engagement with gear wheel 7.

Figure 2:
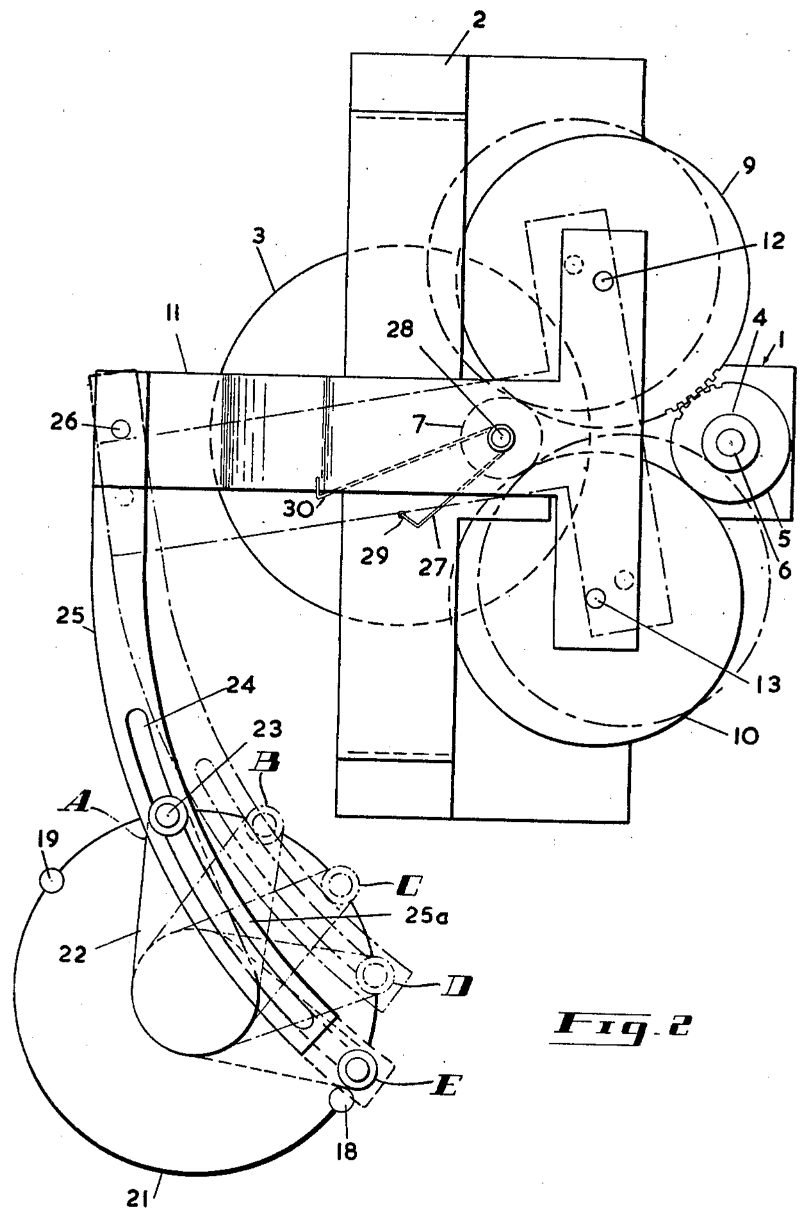
FIGURE 2 is a side view of a preferred embodiment of the variable-rate meter device connected to the switching means of a credit entertainment distribution system.
Figure 3:
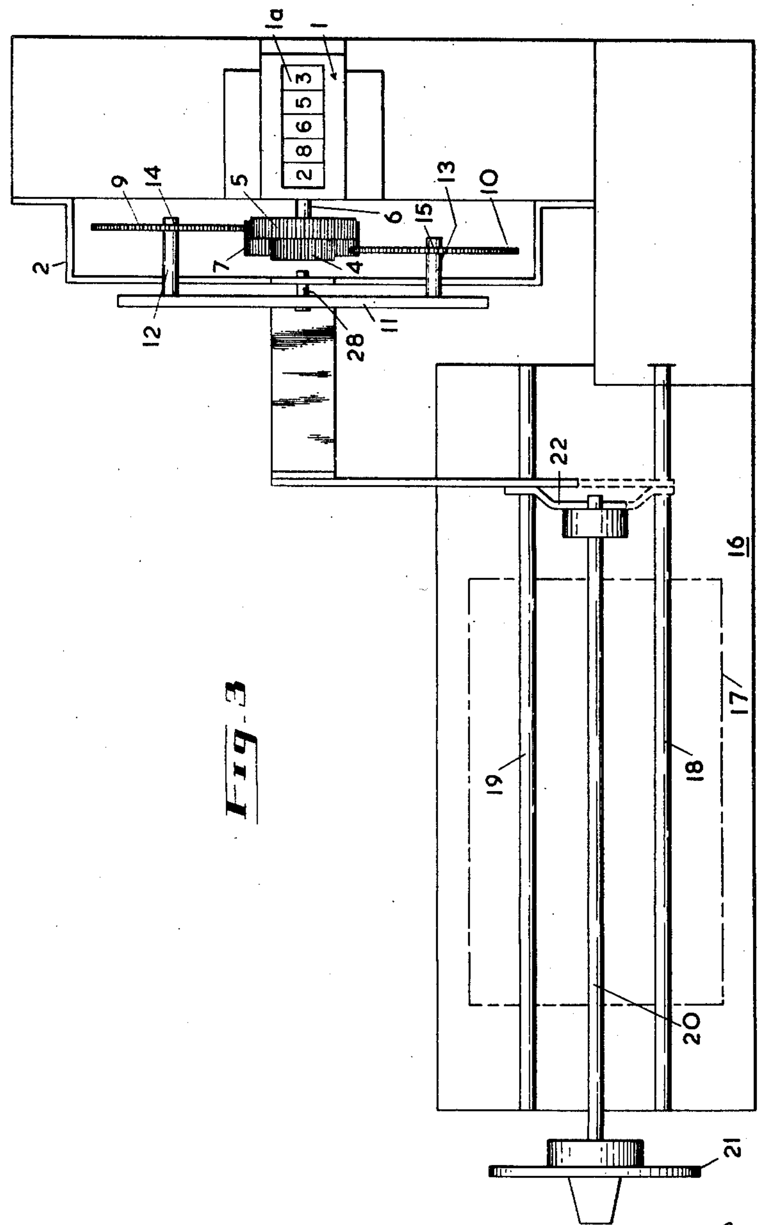
FIGURE 3 is an end view of the device of FIGURE 2.
Figure 4:
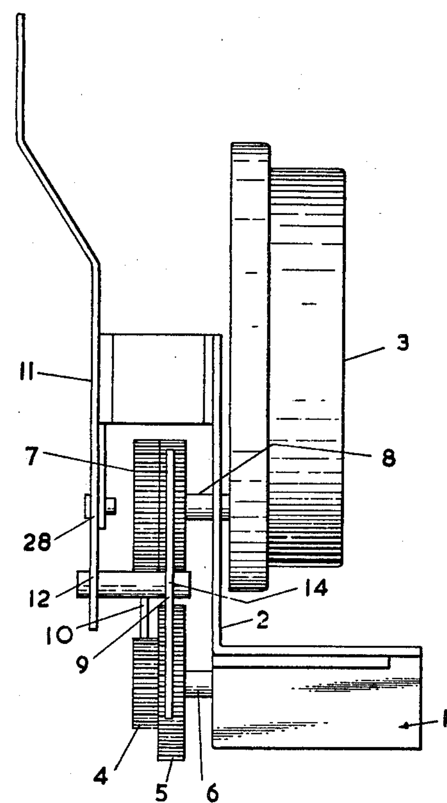
FIGURE 4 is a plan view of the device.

Frame 2 is rigidly mounted to the base of the credit entertainment distribution device for which use it is particularly adapted. An electrical wafer switch 17 is mounted on the base 16 and is held together by supporting rods 18 and 19. Mounted on the shaft 20 of said wafer switch is a knob 21, which may be moved to a number of different positions for programme selection. Cam 22 is rigidly mounted on shaft 20 at the end thereof remote from said handle 21. At the end of the cam 22, radially remote from the shaft 20 of the wafer switch 17, is a projection 23 which extends axially therefrom and through a slot 24 in an arm 25. The end of projection 23 remote from the cam 22 is enlarged such that the slotted arm 25 cannot slide off the projection. The slotted arm 25 which is connected by means of a sealed permanently lubricated bearing 26, to T-shaped frame 11, is pivoted at point 26 enabling the end 25*a* of the arm 25 to move in accordance with the action of the cam 22. A coil spring 27 is mounted on shaft 28 between frame 11 and frame 2. The spring 27 is hooked to frame 2 by means of hole 29 and is held in compression against frame 11 by U-shaped bend 30. In operation the spring 27 normally holds frame 11 in such a position that gear wheel 9 is in contact with gear wheel 5 of the counter. When switch knob 21 is in the first three selector positions A, B and C of FIGURE 2, for which no charge is to be made, the synchronous motor does not operate, even though mechanical connection is made through gear wheels 7, 9 and 5. When the switch is moved to the fourth position shown at D on FIGURE 2 in broken lines, electrical contact is made, the synchronous electric motor 3 is brought into operation and the counter 1 commences to turn over at a rate determined by the gears 7, 9 and 5. The operation of this switch with respect to the electrical circuits in the credit entertainment distribution system may be identical to that described in my copending United States patent application Serial Number 87,181 filed February 6, 1961. The wafer switch performs the same functions as shown in FIGURE 1 of application Ser. No. 87,181, except for the activation of the variable rate meter 2, which is the subject of this application.

Throughout the first four switch positions the cam projection 23 slides easily through the slot 24 of arm 25 which is curved in such a manner that frame 11 is not affected by this movement. However, slot 24 and arm 25 are so shaped and dimensioned that when the selector switch is moved to the fifth position (shown by dotted lines in FIGURE 2) the cam projection 23 pulls down the arm 25 moving the frame 11 rotatably about bearing 28 until gear wheel 10 engages gear wheel 4. At the same time gear wheel 9 disengages from gear wheel 5. Since gear wheels 9 and 10 are of equal size and gear wheel 4 is substantially half the diameter of gear wheel 5, the meter now turns at twice its original speed. It should be understood that any desired metering speed may be chosen or any relative change effected by means of the use of different gear wheels. The inertia of the wafer switch 17 holds the selector in position five against the force of the coil spring 27. It should be noted that cam 22 is so shaped that it abuts against rod 18 of the wafer switch 17 as soon as mechanical engagement between gear wheels 10 and 4 takes place, thus preventing the rotation of the switch shaft too far and the resultant jamming of the gear wheels 10 and 4.

It may be further noted that although electrical contact of the synchronous motor takes place in both the fourth and fifth positions of the selector switch, when the switch is rotated between these two positions mechanical connection between gear wheels 10 and 4 takes place before electrical contact is made so that a subscriber cannot by jamming the handle, for example, receive the signal from the fifth selector position while paying the price of the fourth switch position.

I claim:

1. In a secret television system in which a plurality of visual signals are transmitted with their associated aural signals in a protected manner to provide a plurality of protected television programmes, each of said programmes having a different monetary value, the combination at a subscriber's receiving station of translating means to render such otherwise protected programmes available, switching means for selecting one of said available programmes and meter means comprising: a synchronous motor actuated by said switching means, a rotatable shaft secured to said motor, an elapsed time meter, a gear assembly, said assembly connecting said motor shaft with said elapsed time meter, said gear assembly comprising a first gear wheel rotatably mounted on said shaft, a plurality of secondary gear wheels in driving engagement with said first gear wheel, means responsive to actuation of said switching means, said first-mentioned means being adapted to bring said secondary gear wheels into selective engagement with a gear mounting connected to said elapsed time meter, whereby rotation of said motor shaft actuates said elapsed time meter to indicate thereon at a predetermined rate the debt incurred by the subscriber.

2. The system of claim 1 wherein said gear mounting includes a plurality of gear wheels some of which are of a different size than others arranged in side-by-side relation.

3. The system of claim 1, wherein said gear assembly comprises a first gear wheel rotatably mounted on said shaft, a plurality of secondary gear wheels in driving engagement with said first gear wheel, a movable frame responsive to said switching means, said secondary gear wheels being mounted on said frame so that said secondary gear wheels may be selectively brought into driving engagement with the gear mounting connected to said elapsed time meter, whereby rotation of said motor shaft actuates said elapsed time meter to indicate thereon at a predetermined rate the debt incurred by the subscriber.

4. The system of claim 1 wherein said gear assembly comprises a first gear wheel rotatably mounted on said shaft, a plurality of secondary gear wheels mounted on a movable frame and in constant engagement with said first gear wheel, said frame being responsive to said switching means so that said secondary gear wheels may be individually brought into selective engagement with a gear mounting rotatably connected to said elapsed time meter, whereby rotation of said motor shaft actuates said elapsed time meter to indicate thereon at a predetermined rate the debt incurred by the subscriber.

5. The system as claimed in claim 1 including a control arm and cam operatively connected to said arm and said switching means whereby meter registering and non-registering switch positions may be selected.

6. The system of claim 1 wherein said gear assembly comprises a first gear wheel secured to said rotatable shaft, a plurality of secondary gear wheels mounted on a movable frame and in constant engagement with said one gear wheel, said movable frame having an arm operatively connected to said switching means, a cam on said switching means adapted for cooperation with said arm, said arm and said cam both being so shaped and dimensioned that the switching means may be moved to certain predetermined positions without causing movement of said movable frame or the consequent actuation of said meter, said frame being biased to remain in a preferred position when not activated by said switching means, said secondary gear wheels being adapted for selective engagement with said gear mounting connected to said elapsed time meter whereby rotation of said motor shaft actuates said meter to indicate thereon at a predetermined rate the debt incurred by the subscriber.

7. The system of claim 5 wherein said arm is generally arcuate in shape and is slotted for reception of said cam.

8. The system as claimed in claim 7 wherein said switching means may be moved through further predetermined positions to control the operation of said motor whereby the rate of registration on said meter may be varied in accordance with the switch position selected in which said motor operates.

9. A variable rate meter comprising: switching means, a driving motor actuated by said switching means, a rotatable motor shaft having an end secured to said motor, an elapsed time meter having a visual indicating means, a gear assembly connecting said motor shaft with said meter, said gear assembly including a first gear wheel secured to said motor shaft, a second gear assembly including a plurality of gear wheels, some of which are of a different size than others, arranged in side-by-side relation, and rotatably mounted on an axle of said meter, and a plurality of further gear wheels in driving engagement between said first gear wheel and said second gear assembly whereby rotation of said motor shaft actuates said elapsed time meter shaft to cause said meter to register an amount thereon at a predetermined rate.

10. The variable rate meter of claim 9 further characterized by means responsive to actuation of said switching means, said first-mentioned means being adapted to bring said further gear wheels into selective engagement with one of said gear wheels of said secondary gear assembly connected to said elapsed time meter, whereby rotation of said motor shaft actuates said elasped time meter to indicate thereon at a predetermined rate the debt incurred by the subscriber.

11. The variable rate meter of claim 9 including a movable frame responsive to said switching means, said plurality of further gear wheels being mounted on said frame so that said further gear wheels may be selectively brought into driving engagement with the gear assembly connected to said elapsed time meter, whereby rotation of said motor shaft actuates said elapsed time meter to indicate thereon at a predetermined rate the debt incurred by the subscriber.

12. The variable rate meter of claim 9 wherein said plurality of further gear wheels are all in constant engagement with said first gear wheel secured to said motor shaft.

13. The variable rate meter of claim 9 including a control arm and cam operatively connected to said arm and said switching means whereby meter registering and non-registering switch positions may be selected.

14. The variable rate meter of claim 13 wherein said arm is generally arcuate in shape and is slotted for reception of said cam.

15. A variable rate meter comprising: switching means, a driving motor actuated by said switching means, a rotatable motor shaft having an end secured to said motor, an elapsed time meter having a visual indicating means, a gear assembly connecting said motor shaft with said meter, said gear assembly comprising a first gear wheel secured to said rotatable shaft, a plurality of secondary gear wheels mounted on a movable frame and in constant engagement with said one gear wheel, said movable frame having an arm operatively connected to said switching means, a cam on said switching means adapted for cooperation with said arm, said arm and said cam both being so shaped and dimensioned that the switching means may be moved to certain predetermined positions without causing movement of said movable frame or the consequent actuation of said meter, said frame being biased to remain in a preferred position when not activated by said switching means, said secondary gear wheels being adapted for selective engagement with a gear mounting connected to said elapsed time meter whereby rotation of said motor shaft actuates said meter to indicate thereon at a predetermined rate the debt incurred by the subscriber.

16. The variable rate meter of claim 15 wherein said switching means may be moved through further predetermined positions to control the operation of said motor whereby the rate of registration on said meter may be varied in accordance with the switch position selected in which said motor operates.

References Cited in the file of this patent

UNITED STATES PATENTS 3,051,775 Novak ---------------- Aug. 28, 1962

3,054,492 Michaels -------------- Sept. 18, 1962